United States Patent [19]

Elkin

[11] 4,043,016

[45] Aug. 23, 1977

[54] APPARATUS TO REMOVE RINGS FROM TELEPHONE HAND SET

[75] Inventor: Robert D. Elkin, Claremont, Calif.

[73] Assignee: Collins Machinery Corporation, Monterey Park, Calif.

[21] Appl. No.: 693,135

[22] Filed: June 7, 1976

[51] Int. Cl.² .......................................... B23P 19/04
[52] U.S. Cl. ................................... 29/240; 81/57.2; 81/57.3
[58] Field of Search .................. 81/57.16, 57.2, 57.34, 81/54, 57.39, 180 R, 3.1 B, 3.2, 3.33, 3.45, 57.22; 29/240

[56] References Cited

U.S. PATENT DOCUMENTS

| | | | |
|---|---|---|---|
| 1,812,816 | 6/1931 | Weaver | 81/57.39 |
| 2,060,189 | 11/1936 | Foster | 81/57.33 |
| 2,599,764 | 6/1952 | Krebs | 81/57.22 |
| 3,119,175 | 1/1964 | Lancaster | 29/240 |

Primary Examiner—James L. Jones, Jr.
Attorney, Agent, or Firm—William W. Haefliger

[57] ABSTRACT

Apparatus to unscrew a rotary part from a second part, as for example to remove a securing ring from a telephone receiver, comprises:

a. first means to receive the second part in position for unscrewing of the rotary part which faces downwardly,
b. second means to releasably grip and rotate the rotary part in an unscrewing direction while the second part is in said position, and subsequently to release the unscrewed rotary part,
c. third means to block rotation of the second part while the rotary part is rotated in unscrewing direction relative to the second part,
d. said first and second means located to allow the unscrewed and released rotary part to drop free of the second means, for collection.

10 Claims, 8 Drawing Figures

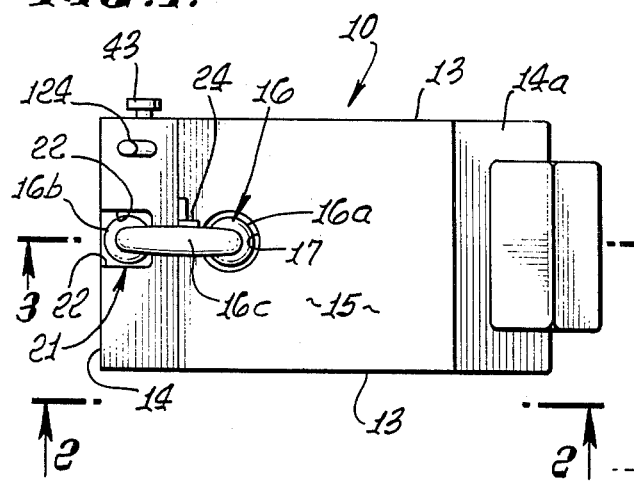
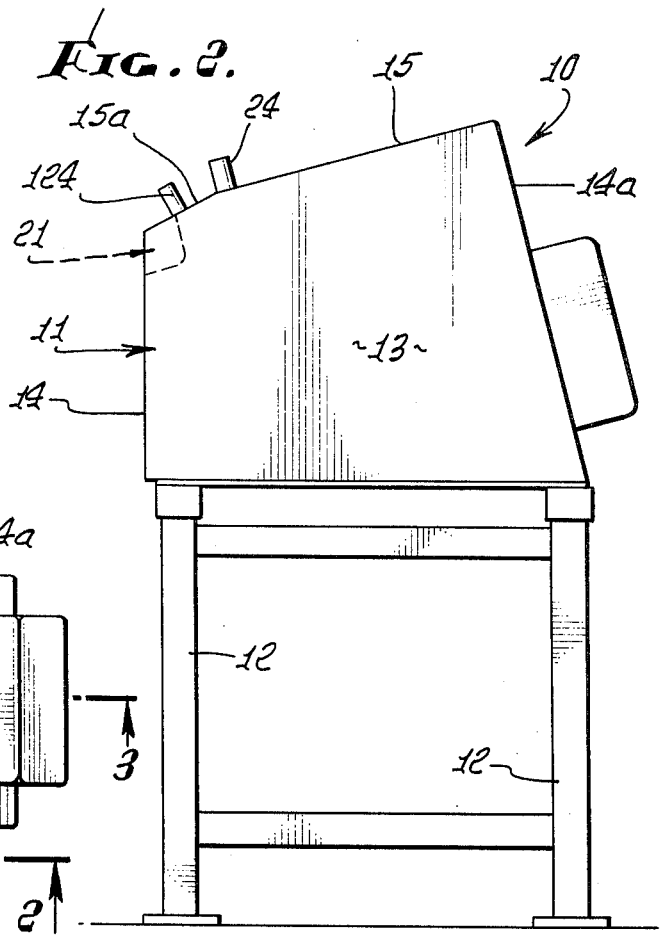
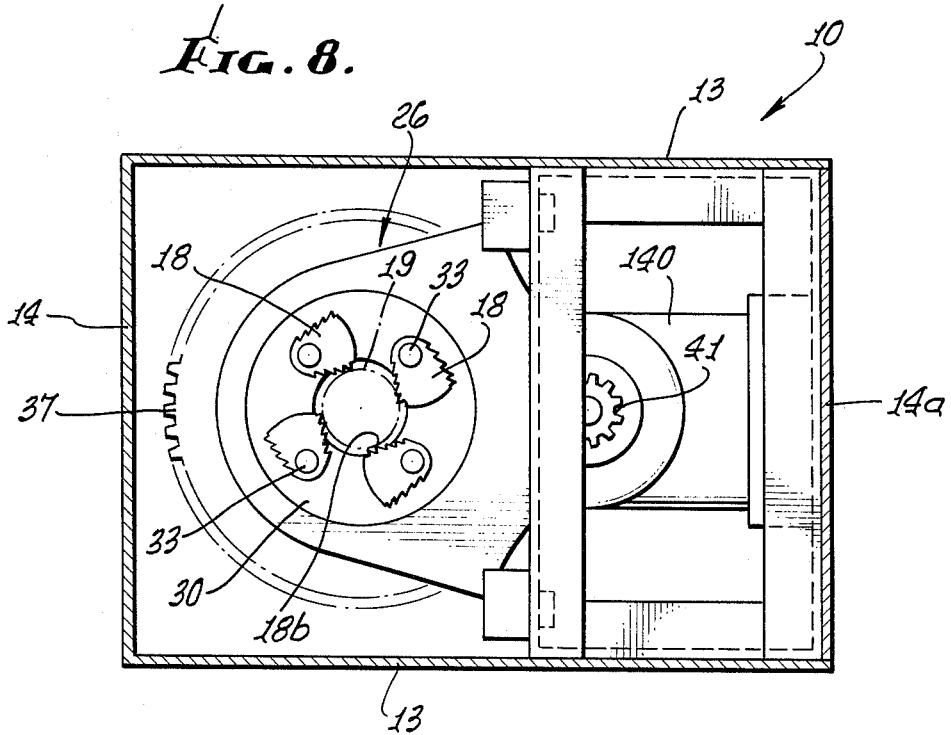

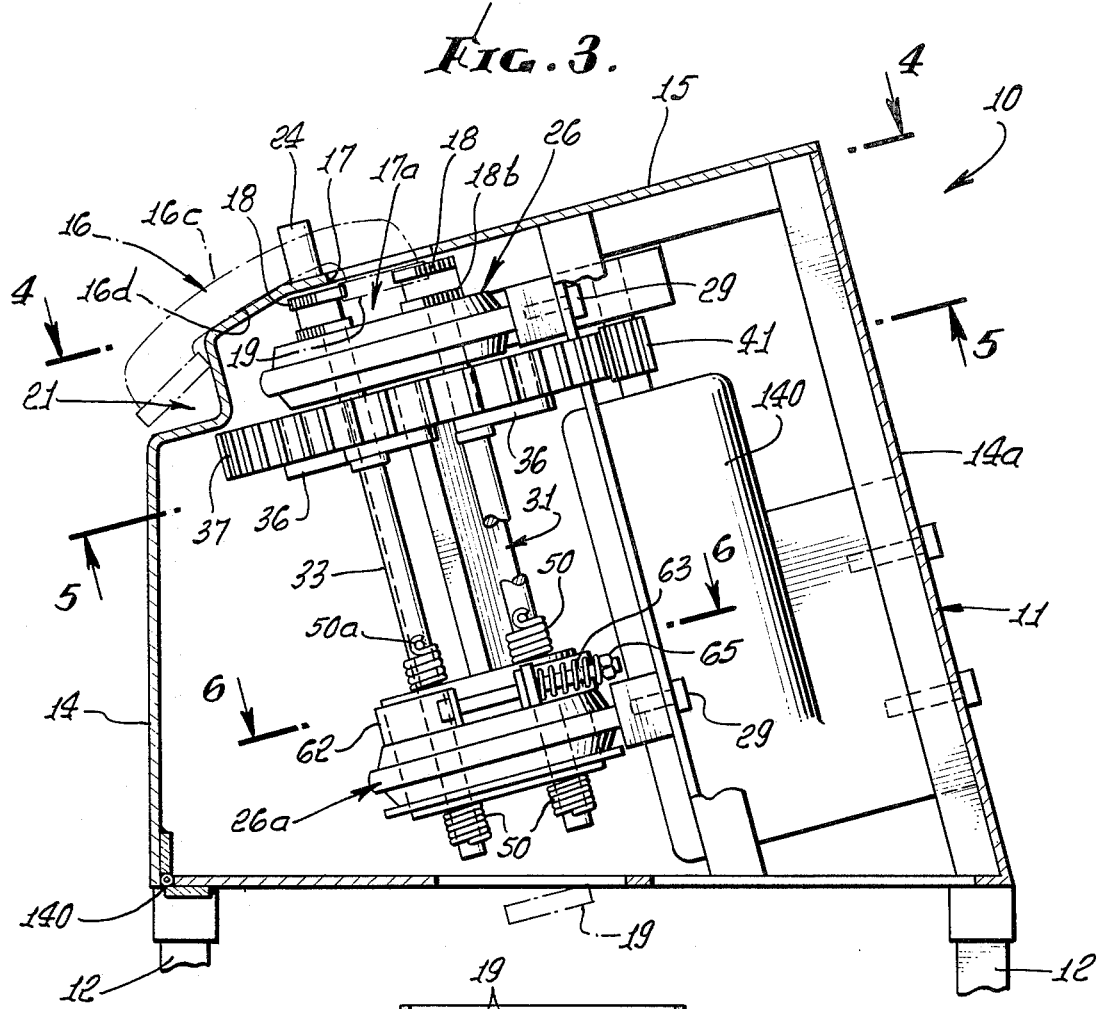

APPARATUS TO REMOVE RINGS FROM TELEPHONE HAND SET

BACKGROUND OF THE INVENTION

This invention relates generally to apparatus for disassembling relatively rotatable parts, and more particularly concerns the rapid unscrewing, release and collection of securing rings from telephone receivers.

Telephone receivers commonly include a handle, a mouthpiece body, and an earpiece body, and securing rings on those bodies. The rings hold the mechanical and electrical elements of the mouthpiece and earpiece in housed position. It has become economical to salvage certain parts of such used receivers, for re-use. Toward this end, the securing rings have been removed but in a time-consuming manner requiring hand manipulation, reducing the economy of the re-cycling process. No way was known, to my knowledge and prior to the present invention, to efficiently and rapidly remove such end rings in the unusually advantageous manner as is now afforded by the present invention, and resulting in substantial savings in time and cost of re-cycling.

SUMMARY OF THE INVENTION

It is a major object of the invention to provide apparatus and method to remove relatively rotary parts from fixed parts, as for example securing rings from telephone receivers, in such manner as to overcome prior disadvantages and problems as described and to enable substantial savings in time and cost.

Basically, the apparatus comprises:

a. a receiver carrier having a first well to receive the earpiece or mouthpiece body of the receiver, b. a chuck exposed to the interior of said well to extend about one securing ring when one of said bodies is removably placed in the well, and c. means for causing said chuck to grip and to rotate said one securing ring in a direction to remove the ring from its associated body, and d. structure to block rotation of the receiver in response to said rotation of the securing ring.

As will appear, the blocking structure may include a second well in the carrier into which the other body is downwardly removably received, and/or a shoulder on the carrier located to be engaged by the receiver handle in response to forcible unscrewing of the securing ring by the chuck; the chuck may include multiple jaws spaced about an axis defined by the securing ring and carried by pivot members on a carrier to rotate toward and away from the securing ring; the carrier may advantageously have multiple functions one of which is to provide a central downwardly extending passage or chute to pass the securing rings after their removal from the receiver and release by the jaws; the carrier may also serve to support the pivot members for rotation for engaging the jaws with the securing ring, and also to rotate the pivot members and jaws bodily about the central axis to transmit force acting to unscrew the jaw engaged ring from the receiver; and torsion springs may be associated with the pivot members to assure their reverse rotation to release the jaws from the securing rings, enabling dropping of the ring through the carrier for collection. In this way, telephone receivers may be quickly processed merely by placing them onto the apparatus and allowing the apparatus to function as described and as will be described.

These and other objects and advantages of the invention, as well as the details of an illustrative embodiment, will be more fully understood from the following description and drawings, in which:

DRAWING DESCRIPTION

FIG. 1 is a top plan view of apparatus incorporating the invention;

FIG. 2 is a side elevations taken on lines 2—2 of FIG. 1;

FIG. 3 is an enlarged vertical section taken on lines 3—3 of FIG. 1;

FIG. 6 is a section taken on lines 6—6 of FIG. 3;

FIG. 7 is an enlarged fragmentary section on lines 7—7 of FIG. 4; and

FIG. 8 is a view like FIG. 4 showing a telephone receiver in ring removing position.

DETAILED DESCRIPTION

Figure 4:
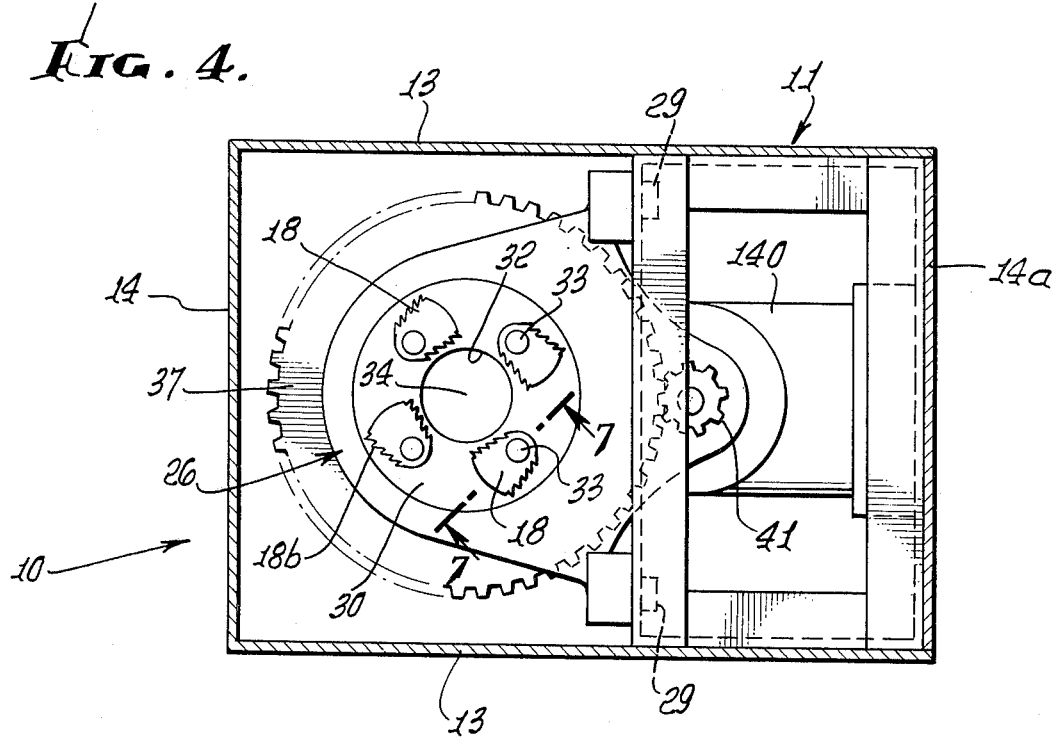
FIG. 4 is a section taken on lines 4—4 of FIG. 3.

Referring first to FIGS. 1-3, apparatus 10 includes a box-like frame 11 which may be carried at desired height as by legs 12. The frame includes upright side walls 13, end walls 14 and 14a and a top wall 15 angled from horizontal, as shown. End wall 14 is outwardly swingable in hinge 140.

The top wall or panel may be considered to define a carrier for a telephone receiver 16 and to define a well to receive the earpiece body 16a or mouthpiece body 16b of the receiver. For example, the wall 15 may contain an opening 17 sized to pass the earpiece body 16a downwardly into a well 17a just below the top panel 15 and interiorly of the frame, as seen in FIG. 3; alternatively, the mouthpiece body 16b may be dropped into that well. Note that chuck jaws 18 just below panel 15 are spaced about the earpiece body and movable into and out of engagement with a securing ring 19 that has thread connection with the body 16a. As will be described, the jaws 18 are bodily rotatable about the earpiece body while in gripping engagement with the ring 19 to rapidly rotatably unthread and remove the ring from the body whereby the ring may be dropped through the frame and collected as in a container 20 seen in FIG. 3.

Structure is provided to locate the remainder of the receiver 16 in response to reception of the securing ring 19 in well 17. Such structure may with unusual advantage include a second well 21 defined by the carrier plate 15, and into which the other body, as for example mouthpiece body 16b, is downwardly removably received during unscrewing of the ring 19 from the earpiece body 16a. The well 21 has upright side walls 22 between which the mouthpiece body loosely fits when placed in that well; further, the top plate 15 is sloped or tapered at 15a to accommodate the concave curvature at 16d of the receiver handle 16c between the mouthpiece bodies, so that the bodies may fit downwardly in the wells sufficiently from ring removal; also; the receiver may be displaced upwardly slightly during ring removal by the jaws, the ring retaining its position, vertically, during unscrewing so that the receiver itself is progressively displaced upwardly during unscrewing.

The above structure may advantageously include a shoulder on the carrier located be engaged by the handle 16c in response to ring unscrewing. For example, a blocking post 24 may be provided, as shown. Accordingly, torque removal from the receiver is accomplished near the ring being unscrewed, and is not dependent on the extent to which the mouthpiece bodies project into the wells. A thumb rest appears at 124.

The frame or housing suitably supports fixed bearing blocks 26 and 26a, as by means of frame members 28 and fasteners 29. The blocks in turn suitably support vertically spaced flanges 30 of a spindle or carrier 31, for rotation. The jaw carrier 31 is hollow, i.e. contains a central through passage 32 of a diameter sufficient to pass the removed rings and guide them toward the collector 20, i.e. the carrier has multiple functions in the simple and effective assembly described.

Figure 5:
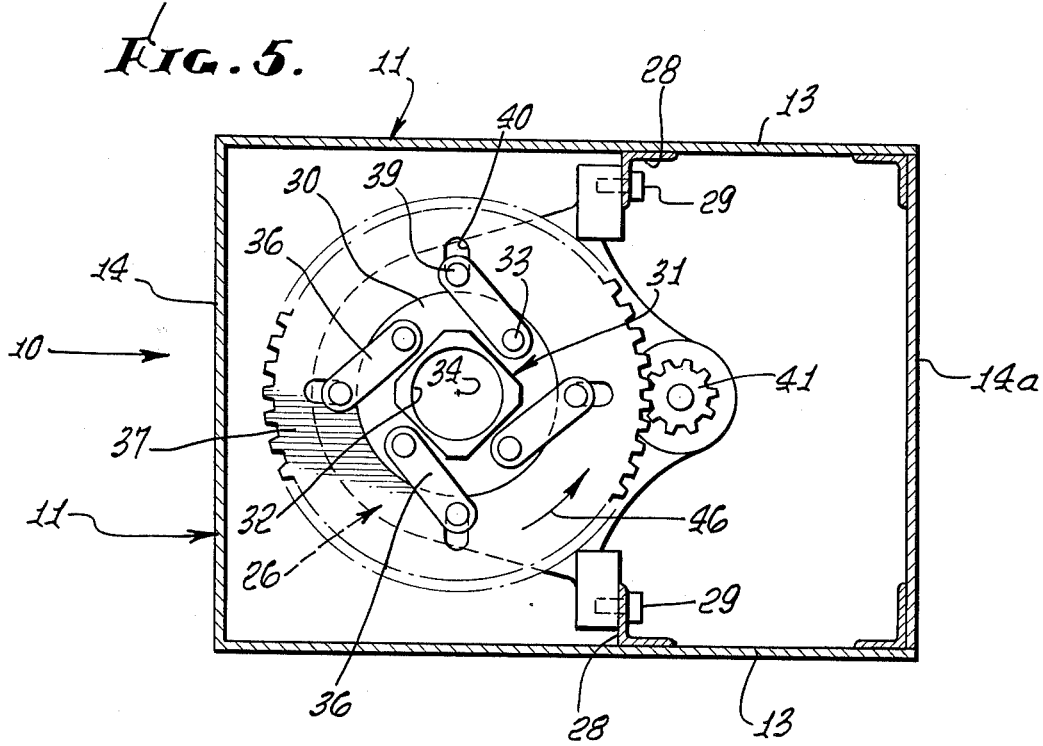
FIG. 5 is a section taken on lines 5—5 of FIG. 3.

The carrier 31 pivotally supports parallel pivot members such as rods 33 equally spaced at 90° intervals about the central axis 34, the rods extending parallel to that axis. Like jaws 18 are attached as by keys 18a to the extreme upper ends of the rods 33. Levers or cranks 36 are attached to the pivot rods at a location 80 between flanges 30, as seen in FIGS. 3, 5 and 7, for simultaneously rotating the pivot members and jaws in response to operation of a drive assembly. The latter includes a drive rotor in the form of a ring gear 37 supported by and rotatable relative to the carrier, as at journal location 38 radially outwardly of the pivot rods 33, for rotation about central axis 34. Levers 36 have lost-motion connection to the drive rotor, as by pins 39 carried by the levers and movable in elongated slots 40. The drive may also be considered to include electric motor 140 driving a pinion 41 meshing with the ring gear. Note that slots 40 extend radially.

The jaws have release position, as seen in FIG. 4, in which the securing ring 19 on a receiver 16 may be inserted into well 17 and between the opened jaws. Upon operation of the drive, as initiated by the start button 43, the jaws are rotated into engagement with the securing ring as seen in FIG. 8 and the carrier or spindle is then rotated in the direction of arrow 46 in FIG. 5, by force transmission from the rotor 37 to levers 36 and then to the members 33 and the carrier 31. This accomplishes unscrewing of the securing rings. Means is provided to restrain such rotation of the carrier by the drive rotor until the jaws have pivoted to engage the securing ring; such means may include a brake shoe 60 urged against the drum surface 61 of the carrier by a band 62. The latter is in turn urged by a spring 63 to adjustably clamp the shoe, an adjustment nut provided at 65 to adjust the spring tension.

Upon completion of such unscrewing, the carrier rotates more rapidly, and the operator may shut the motor off, as via button 43. Also, the jaws are urged in rotary directions to release the securing ring, as by torsion springs associated with the pivot rods. Such torsion springs 50 may extend about the rods as seen in FIG. 3, and may have certain end terminals 50a secured to the pivot rods, and opposite end terminals suitably secured to the flange 30. Accordingly, prompt release of the unscrewed securing ring 19 is assured, whereby it may drop through the central passage or chute into the collector.

It will be noted that the jaws 18 have serrated edges at 18b to forcibly grip the securing ring 19 and rotate it relative to the receiver, against resistance imposed by the tight frictional or bond connection between the ring and receiver.

Brake shoe 60 quickly slows down and stops rotation of the carrier, upon cessation of the drive via the motor.

I claim:

1. In apparatus to release securing rings from a telephone receiver, the rings having thread connection to the receiver earpiece and mouthpiece bodies, the bodies connected by a handle,
   a. a receiver carrier having a first well to receive the earpiece or mouthpiece body of the receiver,
   b. a chuck exposed to the interior of said well to extend about one securing ring when one of said bodies is removably placed in the well, and
   c. means for causing said chuck to grip and to rotate said one securing ring in a direction to remove the ring from its associated body,
   d. structure to block rotation of the receiver in response to said rotation of the securing ring, and
   e. carrier means for the chuck forming a through passage in alignment with said one well and opening downwardly to freely pass removed rings for collection below the level of the carrier means.

2. In apparatus to release securing rings from a telephone receiver, the rings having thread connection to the receiver earpiece and mouthpiece bodies, the bodies connected by a handle,
   a. a receiver carrier having a first well to receive the earpiece or mouthpiece body of the receiver,
   b. a chuck exposed to the interior of said well to extend about one securing ring when one of said bodies is removably placed in the well, and
   c. means for causing said chuck to grip and to rotate said one securing ring in a direction to remove the ring from its associated body,
   d. structure to block rotation of the receiver in response to said rotation of the securing ring, and
   e. there being a second locating well in the carrier into which the other body of the receiver is removably received during said rotation of the one securing ring.

3. The apparatus of claim 2 wherein said structure includes a shoulder on the carrier located to be engaged by the handle in response to said rotation of the securing ring.

4. The apparatus of claim 1 wherein said chuck includes multiple jaws spaced about an axis defined by the securing ring engaged by the chuck, said jaws carried to pivot about jaw axes toward and away from the ring.

5. In apparatus to release securing rings from a telephone receiver, the rings having thread connection to the receiver earpiece and mouthpiece bodies, the bodies connected by a handle,
   a. a receiver carrier having a first well to receive the earpiece or mouthpiece body of the receiver,
   b. a chuck exposed to the interior of said well to extend about one securing ring when one of said bodies is removably placed in the well, and
   c. means for causing said chuck to grip and to rotate said one securing ring in a direction to remove the ring from its associated body, and
   d. structure to block rotation of the receiver in response to said rotation of the securing ring,
   e. said chuck including multiple jaws spaced about an axis defined by the securing ring engaged by the chuck, said jaws carried to pivot about jaw axes toward and away from the ring, and
   f. there being a jaw carrier having an axis of rotation which has a substantial downward component, means to support the carrier for rotation about said axis, and the carrier forming a central through passage in alignment with said one well to freely pass removed rings for collection below the carrier.

6. The apparatus of claim 5 including pivot members on the carrier to have pivot axes axially spaced about the central axis and parallel thereto, the jaws connected to the pivot members, a drive rotor rotatable about said central axis, and levers operatively connected between the drive rotor and pivot members to transmit rotary drive from the rotor to the pivot members and thereby pivot the jaws into engagement with the securing ring and subsequently rotate the carrier and ring for unthreading the ring from the receiver.

7. The apparatus of claim 6 wherein the levers have lost motion connections with the drive rotor.

8. The apparatus of claim 6 including a power source operatively connected with the drive rotor, and means restraining rotation of the carrier by the drive rotor until the jaws have been pivoted in response to rotation of the drive rotor.

9. The apparatus of claim 6 including torsion springs associated with the pivot members to yieldably resist pivoting thereof in rotary directions tending to close the jaws onto the securing ring, whereby upon completion of unscrewing of the ring from the receiver the springs may urge the pivot members and jaws in reverse rotary directions to release the ring.

10. In apparatus to unscrew a rotary part from a second part,
  a. first means to receive the second part in position for unscrewing of the rotary part which faces downwardly,
  b. second means to releasably grip and rotate the rotary part in an unscrewing direction while the second part is in said position, and subsequently to release the unscrewed rotary part.
  c. third means to block rotation of the second part while the rotary part is rotated in unscrewing direction relative to the second part,
  d. said first and second means located to allow the unscrewed and released rotary part to drop free of the second means, for collection.

* * * * *